(12) United States Patent
Pellenc et al.

(10) Patent No.: US 6,840,026 B2
(45) Date of Patent: Jan. 11, 2005

(54) MULTIPURPOSE MACHINE FOR CLOSE-ROW PRODUCTION FOR TREE OR SHRUB PLANTATIONS SUCH AS VINEYARDS OR ORCHARDS

(75) Inventors: Roger Pellenc, Pertuis (FR); Robert Delran, Pertuis (FR)

(73) Assignee: Pellenc, S.A., Pertuis (FR)

( * ) Notice: Subject to any disclaimer, the term of this patent is extended or adjusted under 35 U.S.C. 154(b) by 0 days.

(21) Appl. No.: 10/203,989

(22) PCT Filed: Feb. 14, 2001

(86) PCT No.: PCT/FR01/00434

§ 371 (c)(1),
(2), (4) Date: Oct. 15, 2002

(87) PCT Pub. No.: WO01/62067

PCT Pub. Date: Aug. 30, 2001

(65) Prior Publication Data

US 2003/0089508 A1 May 15, 2003

(30) Foreign Application Priority Data

Feb. 18, 2000 (EP) .............................................. 00430008

(51) Int. Cl.$^7$ .............................................. A01D 75/18
(52) U.S. Cl. ........................................ 56/10.3; 56/10.7
(58) Field of Search ................................ 56/10.3–10.7, 56/12.7, 15.2, 11.9, 16.5; 172/49.5, 111, 59, 68, 112, 123, 160, 713

(56) References Cited

U.S. PATENT DOCUMENTS

| 2,206,283 A | 7/1940 | Jacobs | |
|---|---|---|---|
| 2,838,901 A | * 6/1958 | Davis | 56/10.3 |
| 3,059,704 A | * 10/1962 | Anatol | 172/38 |
| 3,526,083 A | * 9/1970 | Watson et al. | 56/10.7 |
| 3,715,872 A | * 2/1973 | Thompson, Jr. | 56/10.4 |
| 4,552,223 A | * 11/1985 | van der Lely | 172/49.5 |
| 4,802,327 A | * 2/1989 | Roberts | 56/15.2 |
| 5,378,852 A | * 1/1995 | Manor | 144/4.1 |
| 5,430,999 A | * 7/1995 | Grant | 56/11.9 |
| 5,632,344 A | * 5/1997 | Fix | 172/111 |
| 6,311,746 B1 | * 11/2001 | Halvorson et al. | 144/24.13 |

FOREIGN PATENT DOCUMENTS

| DE | 35 07 475 | 9/1986 |
|---|---|---|
| FR | 86 321 | 4/1966 |
| FR | 1 469 298 | 5/1967 |
| FR | 2 109 237 | 5/1972 |
| FR | 2 770 740 | 5/1999 |

* cited by examiner

Primary Examiner—Robert E Pezzuto
(74) Attorney, Agent, or Firm—Harrison & Egbert

(57) ABSTRACT

A multipurpose machine for close-row production of tree or shrub plantations, such as vineyards or orchards includes a working head including a rotor powered by a motor and designed for receiving at least two interchangeable tools. The invention also includes a meshing guide peripherally configured to mesh with the foot of trees or shrubs and arranged above the tools, the meshing guide being capable of rotating at a speed different from that of the rotor and having, viewed from the direction of said axis, the general shape of a notched disc having at its periphery alternating notches and projecting parts, the length of the operating radius of the rotary tools being not more than that of the radius of a circle tangent to the base of the notches of the guide, which can thereby, in operation, successively mesh with the base of the trees or shrubs, when coming in contact with the latter.

22 Claims, 14 Drawing Sheets

MULTIPURPOSE MACHINE FOR CLOSE-ROW PRODUCTION FOR TREE OR SHRUB PLANTATIONS SUCH AS VINEYARDS OR ORCHARDS

RELATED U.S. APPLICATION

Not applicable.

STATEMENT REGARDING FEDERALLY SPONSORED RESEARCH OF DEVELOPMENT

Not applicable.

REFERENCE TO MICROFICHE APPENDIX

Not applicable.

FIELD OF THE INVENTION

The invention presented here involves a multifunctional machine for cultivating between trunks in tree or shrub plantations, generally planted in rows, such as vineyards or orchards, where such a machine can be used, for example, for hoeing work or mowing work, for the mounting on the rotor of its working head, of tools adapted to the nature of the work to be done.

BACKGROUND OF THE INVENTION

Hoeing machines or vineyard plows designed to work the ground between the trunks of trees or shrubs of a plantation planted in rows are known that have the goal of eliminating the useless plants that can grow between the trunks by breaking up the crust of the ground.

The invention involves machines of the type consisting of a working head mounted so that it turns around an axis oriented perpendicularly or approximately perpendicularly to the ground during work.

Known machines of this type (U.S. Pat. No. 4,332,299A, FR-1.577.988A, FR-2.683.117A, FR-1.469.298A) consist of a working head containing a horizontal rotary tool-holder driven by a hydraulic motor or by the power take-off shaft of an agricultural tractor and on its lower side, teeth or blades are rigidly affixed extending towards the bottom. In order to prevent the turning assembly comprised of the rotary plate and the hoeing teeth from coming into contact with the trunks of the plants, trees or shrubs, a sensor is mounted in front of and at a distance from the hoeing head, in a manner so that when this sensor encounters a trunk of a tree or shrub, it is pushed back and controls a hydraulic device that ensures the lateral retraction of the hoeing head as it approaches this trunk. After passing the trunk, the sensor returns to its initial position and controls the hydraulic device which replaces the hoeing head in the inter-vinestock or inter-trunk areas.

These machines which allow a mechanization of the plowing work done between the vinestocks or between the trunks of the trees or shrubs of the plantations, have however several notable disadvantages.

None of them has a multifunctional character.

Taking into account the fact that their hoeing head moves aside as it approaches the trunks and repositions itself after passing them, the duration of this movement and the displacement of the machine allow more or less sizeable zones that have not been worked to remain at the trunks of the shrubs or trees.

Their sensor can be activated during the encounter of undesirable plants that are resistant to bending, which causes the retraction of the hoeing head and the creation of zones that have not been weeded.

The use of a sensor and a hydraulic device for control of the withdrawal of their hoeing head complicates their manufacture and their maintenance and unfavorably influences their cost price.

In the document FR-2.109.237 A, a mowing and hoeing machine consisting of a working head of the type mentioned above is described, above which a flat disk is arranged that is free in rotation and has a diameter slightly greater than the diameter of the working surface of the tools, in a manner such that upon encountering a vinestock, the flat disk is supposed to roll on the vinestock, in a manner that allows a mowing or hoeing action very close to the vinestock and without harming it. However, the encounter of this disk with the trunks of the shrubs generates shocks having a harmful effect on the plant; for example, at certain periods of the year, the vine is very sensitive to vibrations and shocks causing a large percentage of the buds to fall. In addition, these shocks can cause the hoeing head to bounce, while in the best of cases, the turning disc only rolls over a reduced portion of the periphery of the trunks of the shrubs, in a manner so that the work around these trunks can not be regular.

In the other hand, the rotation of the tools at an increased speed causes a movement of the ground and the pulled-out plants and this moving mass can perform the function of a friction clutch causing the flat disk to rotate at a speed that is more or less sizeable. During the encounter with the vinestock, the existence of a relative speed between the vinestocks and the flat disk turning can inflict harm on these vinestocks or cause the working head to bounce, increasing the risks of laceration of the vinestocks and irregularity in working the ground around them, these injuries can be aggravated when the working head moves on banked ground.

Because of the above disadvantages, the speed of progression of the machine must necessarily be relatively slow.

BRIEF SUMMARY OF THE INVENTION

A first object of the invention is to correct the disadvantages mentioned above of the machine of the aforementioned type, for cultivating the soil.

According to a first characteristic arrangement, this objective is achieved using a machine for cultivating the soil comprising a working head comprising at least two rotating tools mounted on a rotor driven by a motor, this machine being notable in that it contains a meshing guide shaped peripherally in order to engage with the trunk of trees or shrubs and arranged above the rotary tools, preferably coaxially to their axis of rotation, where this engaging disk is capable of turning at a different speed than that of the rotor and has, seen in the direction of the axis, the general shape of a notched disk having, alternately, on its periphery, notches and projecting parts, the length of the operating radius of these rotary tools being equal to or less than that of the radius of a circle tangent to the base of these notches of the guide which thus can, during work, mesh successively with the trunks of the trees or shrubs, when they are encountered.

Using these characteristic arrangements above, the multifunctional machine for cultivating between trunks according to the invention does not contain any device for lateral withdrawal controlled by a sensor in order to move away its working head when it approaches the trunks of the vine or other trees or shrubs, or when it encounters undesirable plants resistant to bending.

In fact, the working head can come to contact the trunks of the shrubs around which it can cause a half-circle as a result of engaging with them. It is understood that the tools can thus turn around the trunks of the shrubs or trees, very close to them but without touching them, and, as a result, without risk of injuring or cutting them.

The machine according to the invention thus does not allow any unworked zone around the vinestock or trunks of the plants.

On the other hand, when the meshing guide enters into contact with a trunk of the vine or other shrub, it engages with it in a manner such that no relative speed exists between the guide and the trunk which does not run the risk being injured by a sudden contact with a fixed equipment or with an instrument turning at an increased speed. In addition, this engaging creates conditions that are unfavorable to the creation of bouncing when the working head encounters a trunk of a shrub.

According to another characteristic arrangement, the meshing guide is coupled to a motorization that allows it to be guided in rotation at a speed approximately equal or, preferably slightly greater than the speed of progress of the machine during work.

Using this characteristic arrangement, the multifunctional machine for cultivating between trunks according to the invention can perform work that is regular and without jolts; in fact, the meshing guide "winds" more easily around the trunks or vinestocks that are now less exposed to shocks or to frictions likely to shake them, or to inflict injury on them. It is thus possible to increase the speed of progress of the machine during work, relative to comparable equipment. Also, any possibility of runaway of the meshing guide is suppressed by the engaging action that can be produced by the mixture of the ground, plants and roots moved by the rotary tools.

In addition to the disadvantage already emphasized by a movement at a slow speed, the machine described in the French patent FR-2.109.237A has the additional disadvantage in the fact that its hoeing head can only work slowly, considering that the high-speed rotation of the hoeing head would cause dangerous ejections of rocks.

According to another important characteristic arrangement of the invention, this problem is solved due to the fact that the meshing guide has in its central part, the general shape of a bell.

By this shape, the ejections of dust or rocks is considerably reduced in a manner such that the working head can rotate at relatively high speeds, without risk for the driver of the machine or for persons nearby.

In addition, this shape makes it possible to limit the depth of the work of the tools. On the other hand, the inside open volume of the bell makes it possible to prevent the compression of the layer of ground broken up by the hoeing tools.

Another advantage resulting from the embodiment of the meshing guide in the form of the bell is that it gives a multifunctional character to the working head which can be used either for hoeing or similar work when the farmers are in favor of weeding, or as a mowing machine when the farmers prefer to cultivate their vineyards or orchards while they are budding.

According to another characteristic arrangement, the ends of the peripheral projecting parts of the meshing guide are raised relative to the base of its central part that is in the shape of a bell.

By this arrangement, the meshing guide in the shape of a bell can easily slide on the ground, without scraping it, whereby the ends raised in the shape of a ski make it possible to easily climb up banks and to follow the unevenness of the ground.

Another disadvantage of these hoeing machines described in the aforementioned documents results from the fact that their hoeing head is directly carried by the distal end of an arm that is attached, by means of its opposite end, onto a vehicle such as an agricultural tractor. This mounting has the disadvantageous effects of not allowing the better positioning of the hoeing head, during work, relative to the configuration of the ground, and a certain propensity of the hoeing head to skip, and progress then by successive bounces, notably in rocky areas, while leaving the surfaces unweeded. In addition, during its movement, the hoeing head encounters grasses and plants naturally oriented vertically, in a manner so that these plants have a tendency to wind around the tools.

These disadvantages are corrected according to another very significant arrangement characteristic of the invention, by an arrangement according to which the working head of the machine is hitched to a heavy runner fitted to slide over the ground, by means of a coupling device permitting turning movements of the working head around the two perpendicular axes.

By this arrangement the working head is always correctly positioned relative to the ground, the runner constituting a sort of tractor/tool interface, making it possible to place the working head in an ideal position relative to the configuration of the ground. On the other hand, the preliminary passage of the heavy runner that precedes the working head has the effect of flattening the grasses and other plants, and pushing back rocks and broken branches, which prepares the ground for the working head and makes easier the action of its tools.

This advantage is improved by another characteristic arrangement of the invention, according to which the tractor runner is fixed to the distal end of an arm with a freedom of movement around at least two axes that are perpendicular relative to the ends.

With this arrangement, the heavy runner follows closely the unevenness of the ground and stays permanently in the position set by the ground, in a manner such that the working head hitched to the heavy runner is always placed in good position relative to the ground over its entire path.

BRIEF DESCRIPTION OF THE SEVERAL VIEWS OF THE DRAWINGS

The above goals, characteristics and advantages, and yet others, emerge best from the description that follows and the attached drawings.

DETAILED DESCRIPTION OF THE INVENTION

Figure 1:
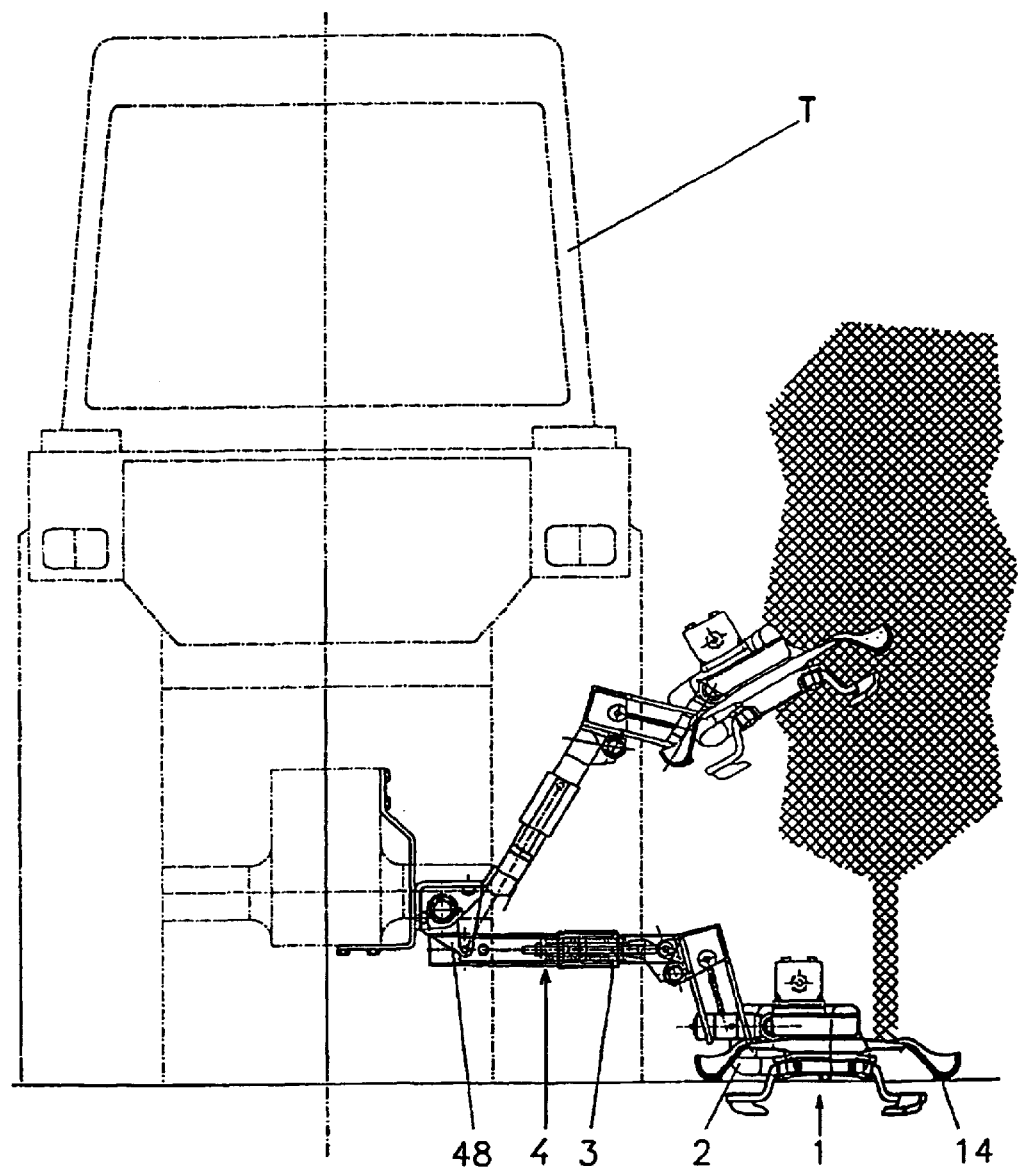
FIG. 1 is a front view showing a first embodiment example of the machine for cultivating the ground according to the invention, used as a hoeing machine, shown mounted on a tractor summarily shown, the bold line showing the position of this machine during work, while the fine line shows the raised position of the hoeing equipment.

Reference is made to the drawings in order to describe examples that are of interest but in no way restrictive, of the embodiment of the multifunctional cultivating machine according to the invention.

According to the example shown in FIGS. 1 to 13, the machine consists of a towing attachment frame allowing it to be affixed to one of the sides of the chassis of a farm tractor, but it is specified that this frame can be adapted in shape in order to allow its installation on any other position of the frame of a tractor or a vehicle of another type specially designed for hoeing work or other work. It is also possible to mount two machines according to the invention on a same farm tractor, one on each side of it, which signifies that according to the placement of its mounting, the machine can be adapted in order to work to the right or to the left of the tractor or another carrying vehicle.

According to the very advantageous example shown in the drawings, the machine consists of a working head 1, attached to a heavy runner 2 itself affixed to an adjustable arm 3 of the towing attachment frame 4.

The working head 1 (FIGS. 4 and 5) consists of a geared motor preferably comprised of a hydraulic motor 5 and of a reduction gear 6 driving a rotor 7 by means of a shaft 8 mounted to turn in a housing 9.

In an advantageous manner, the reduction gear 6 is a reduction gear in mesh making it possible to shift, the hydraulic motor 5 towards the inside relative to the center of the working head 1, in thus moving it away from the vinestocks it would run the risk of hitting during work.

Over a peripheral zone of the rotor 7, at least two tools are affixed, in a detachable manner, and by means of a cylindrical joint.

When the machine is used as a hoeing machine or a similar machine (FIG. 4) designed to pull out harmful grasses or plants and/or break up the surface of the ground, the tools are comprised of flyweights containing a leading edge that is somewhat sharp. In a very advantageous manner, these hoeing tools 10A are of a particular type described in another patent application by the applicant.

Figure 5:
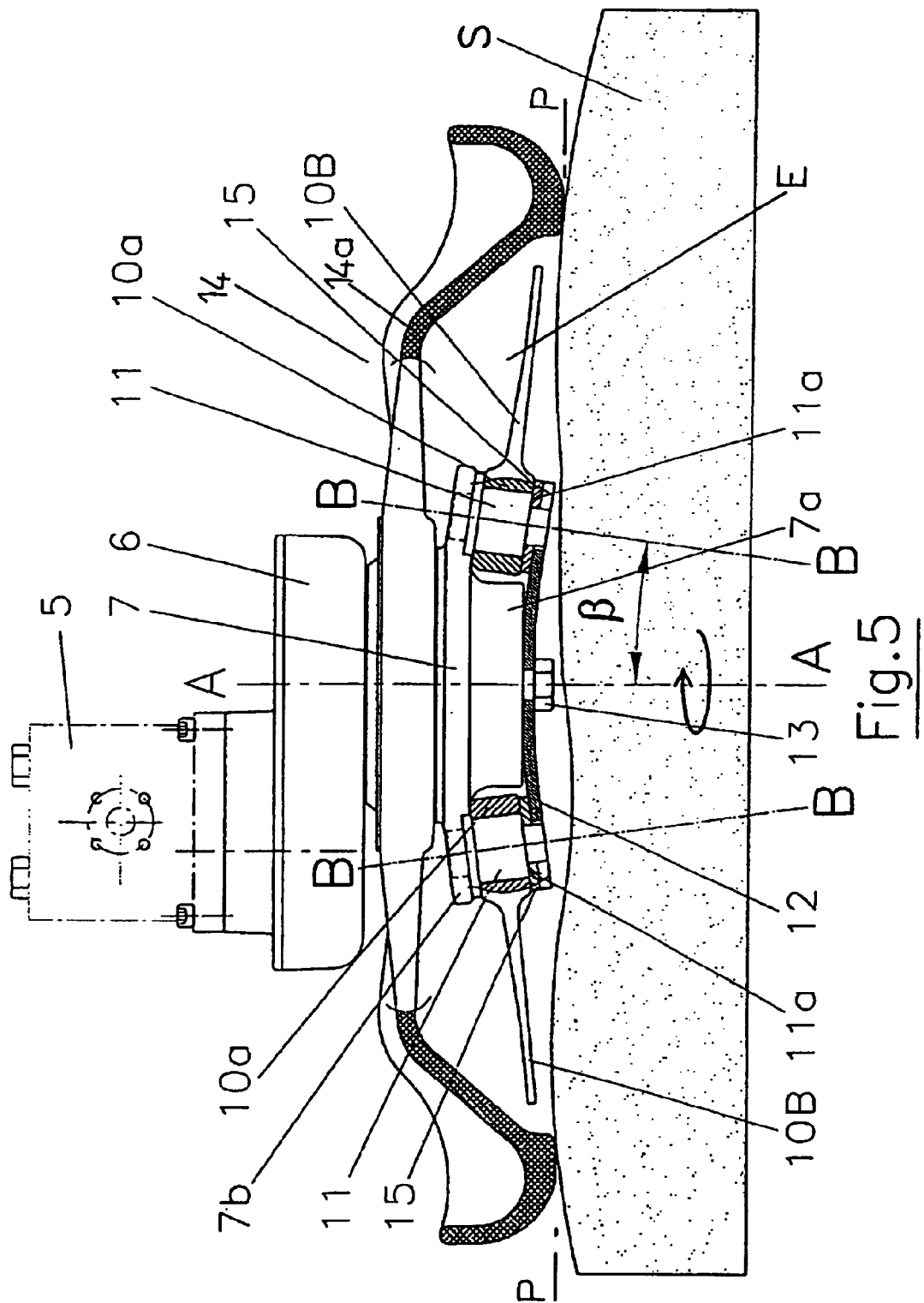
FIG. 5 is a section view similar to FIG. 4 and showing the use of the working head as the mowing or shearing head.

On the other hand, when the machine is used as a mowing or shearing machine, the tools are comprised of cutting blades 10B (FIG. 5).

The rotor 7, the tools 10A or 10B and the detachable fixation system of these tools are shaped and constructed in order to make possible the mounting on the rotor, with a freedom of turning having a limited amplitude, of at least two tools 10A or 10B. In an advantageous manner, the tools 10A or 10B are mounted in conditions such that when they are installed on the rotor, their axes of turning B—B converge to the bottom in the direction of the axis of rotation A—A of it, in forming an angle with the axis of rotation A—A, for example, at an angle on the order of 9°.

The detachable system for attaching the tools 10A or 10B, consists of, for each of them, a hinge pin 11 around which is mounted, with a turning amplitude, the collar joint 10a of the tool. One of the ends of this hinge pin is housed in a bore hole arranged in the vicinity of the periphery of the rotor 7, while its opposite end is engaged in an opening in a clamp 12. A pressure disk 15 can be arranged around the lower end of the hinge pin 11, between a circular collar 11a of it, and the clamp 12, in a manner so as to allow the turning of the tool.

The holes arranged in the rotor 7 for the mounting of the interchangeable tools 10A or 10B have an axis B—B inclined relative to the axis of rotation A—A of the rotor, in a manner so that the hinge pin 11 and the axes of the collar mounting joints 10a are also inclined along the axis B—B.

The clamp 12 is affixed axially to the base of the rotor 7 by means of a single screw 13 going through a central opening of the clamp and screwing into a threading arranged in the lower portion of the shaft 8.

On this manner, in order to replace the tools 10A or 10B, for example in case they become worn, it is sufficient to unscrew the bolt 13, to take off the clamp 12 and the washers 15, to detach the tool to be replaced with its hinge pin 11. In order to affix the new tools, the procedure is done in the reverse order.

The working head of the machine for cultivating the ground according to the invention can be equipped with at least two tools 10A or 10B, but its rotor 7 can be shaped in order to accommodate three or more tools, angularly and regularly spaced.

Figure 4:
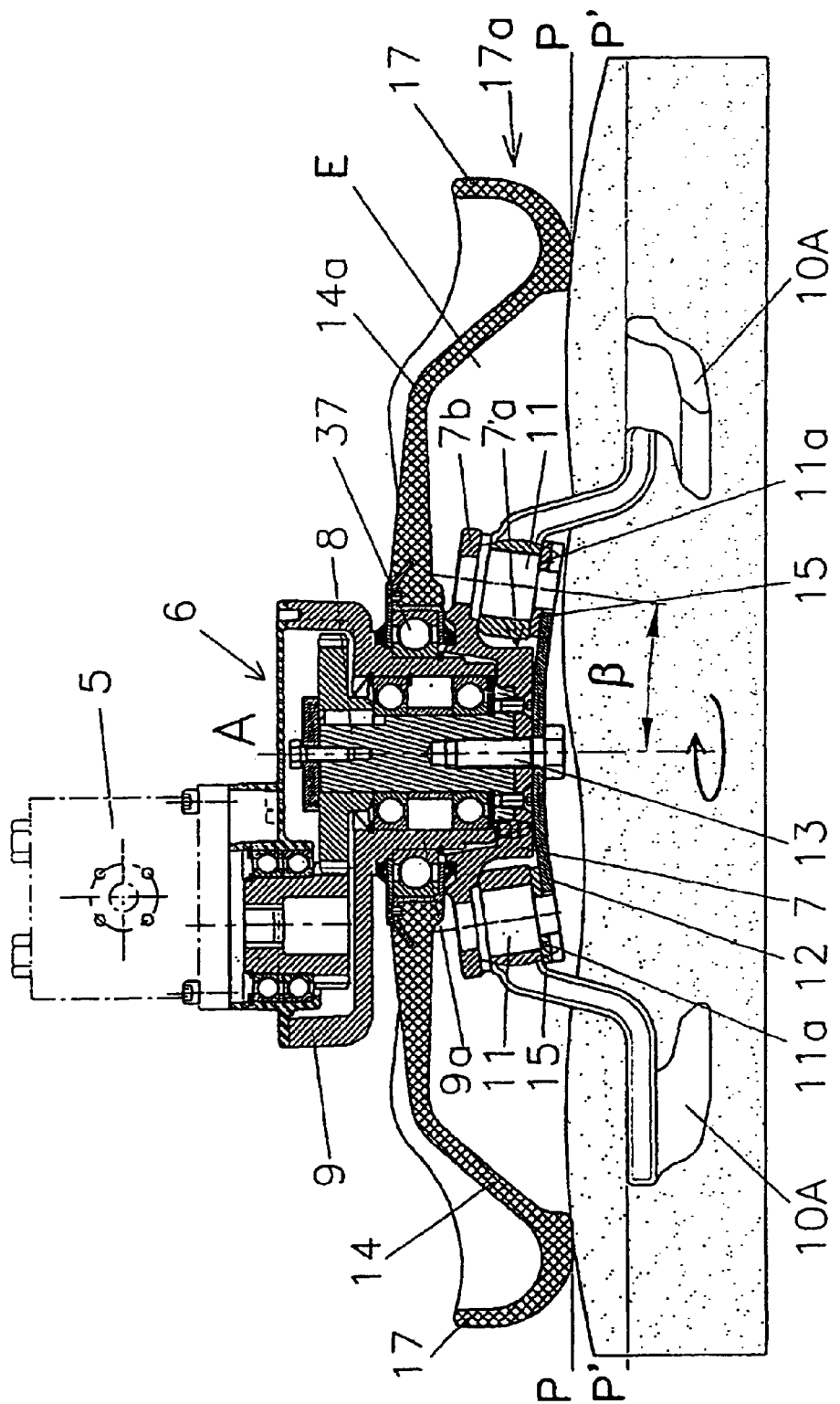
FIG. 4 is an axial section view on a larger scale of the hoeing head.

When the working head is equipped with two tools 10A or 10B, these tools are affixed in the diametrally opposed sites of the rotor 7 (FIGS. 4 and 5). In this case, and as shown in FIGS. 4 and 5, the support surfaces of the clamp 12 comprised of the lower sides of the washers 15 and the central portion of the rotor 7, are placed in a circular arc, thus the clamp is roughly planar and equipped with a capacity for elastic deformation. When the bolt 13 is screwed at the bottom, a concave deformation of the clamp 12 is caused, the ends of which are then greatly applied, by a spring effect, onto the support washers 15 of the hinge pins 11.

When the rotor turns at speeds between 200 and 3000 rpm, the tools 10A or 10B have a tendency to move apart from their axis of rotation A—A, under the action of centrifugal force, and their working part occupies their lowest position. When a knife encounters an obstacle (large rock), it turns and moves aside in climbing back up to the rear, because of the slope of its turning axis B—B.

This arrangement makes it possible to reduce the violence of possible shocks and to prevent the blades from becoming prematurely unusable.

The rotor 7 comprises a lower cylindrical part 7a having a more reduced diameter than that of its upper part 7b under which the tools 10A or 10B are affixed. This lower cylindrical part 7a functions as a stop limiting the retraction movement of the tools towards the rear when they encounter a hard obstacle.

According to another important characteristic arrangement of the invention, a turning guide 14 is arranged above the tools 10A or 10B, preferably coaxially to the axis of rotation A—A of them. This guide is, for example, mounted around the lower cylindrical portion 9a of the casing 9, by means of a rolling bearing 37, in a manner such that it can turn around the axis of rotation A—A of the rotor 7.

This turning guide has, seen in the direction of the axis A—A, the general shape of a notched disc consisting of, alternately, on its periphery, notches 16 and projecting parts 17.

Figure 2:
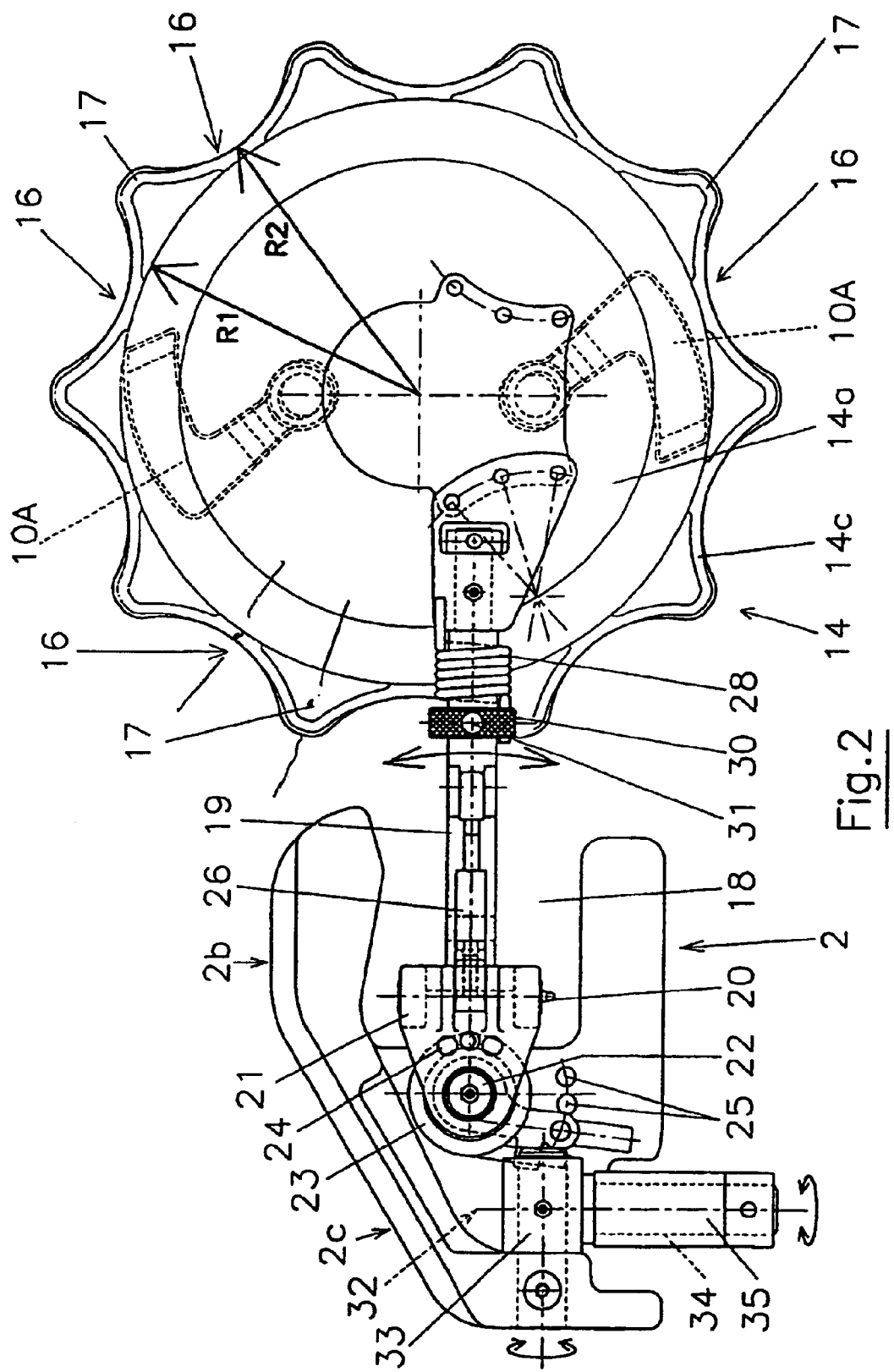
FIG. 2 is a plan view and on a larger scale, the hoeing equipment dragged by this machine.
Figure 3:
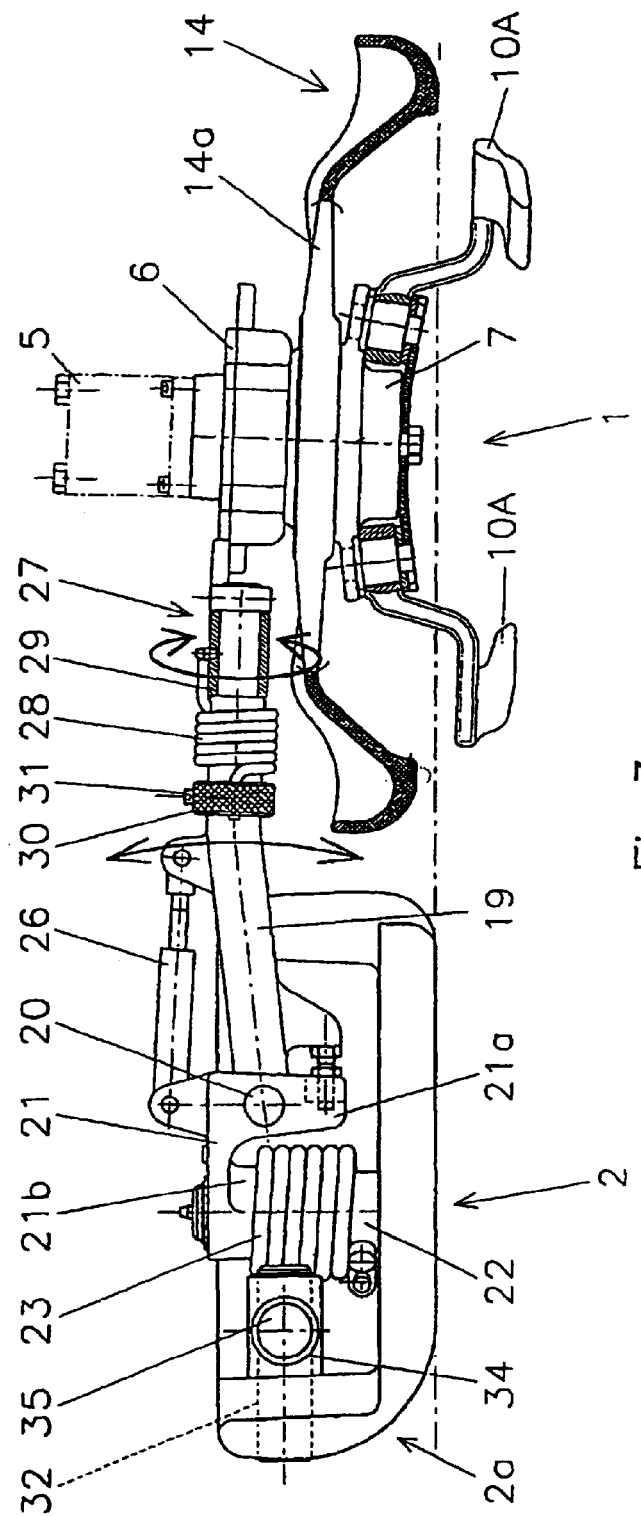
FIG. 3 is a side view with partial sectional views of FIG. 2.

When the meshing guide 14 is, according to a preferred embodiment mode, mounted coaxially to the axis of rotation A—A of the tools 10A or 10B, this guide is dimensioned in such a manner that the length of the maximum operating radius R1 of these rotary tools 10A or 10B, is either less than or equal to the length of the radius R2 of a circle tangent to the base of the notches 16 of the guide (FIG. 2).

The notched guide 14 can be mounted in free rotation.

However, according to an advantageous embodiment mode described in the following present explanation, the notched guide 14 is coupled to a motorization that ensures it is driven in rotation at a speed approximately equal to the linear speed of advancement of the tractor or other vehicle equipped with the cultivating machine, this ratio of speeds can be obtained by using a hydraulic converter that is known itself, or, preferably, by the hydraulic circuit described in the following.

Figure 11:
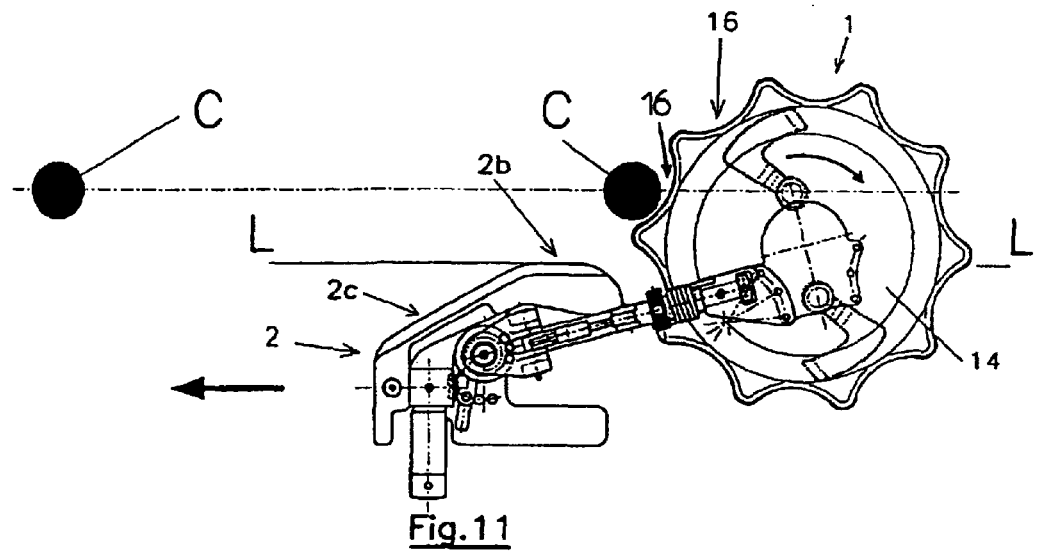
FIGS. 11, 12, and 13 are plan views of the equipment dragged by the machine, showing three successive phases of getting around "as close as possible" to a vertical obstacle such as the vinestock of the vine, a fence pole, a tree trunk.
Figure 12:
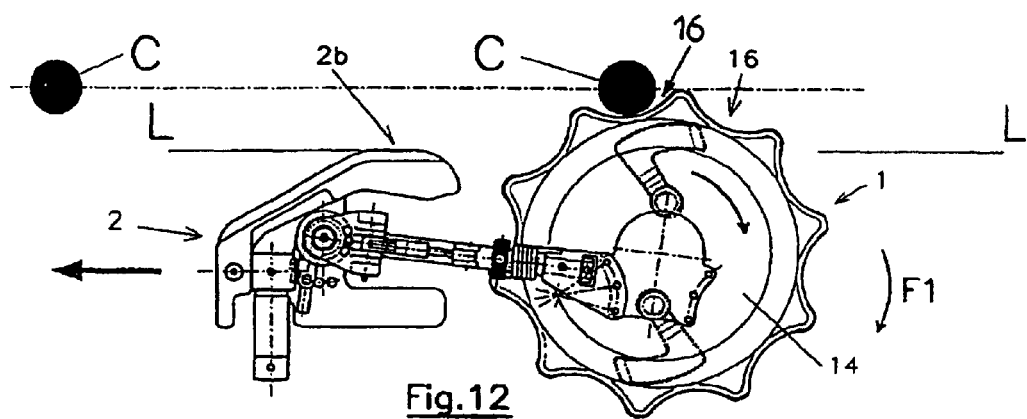
Figure 13:
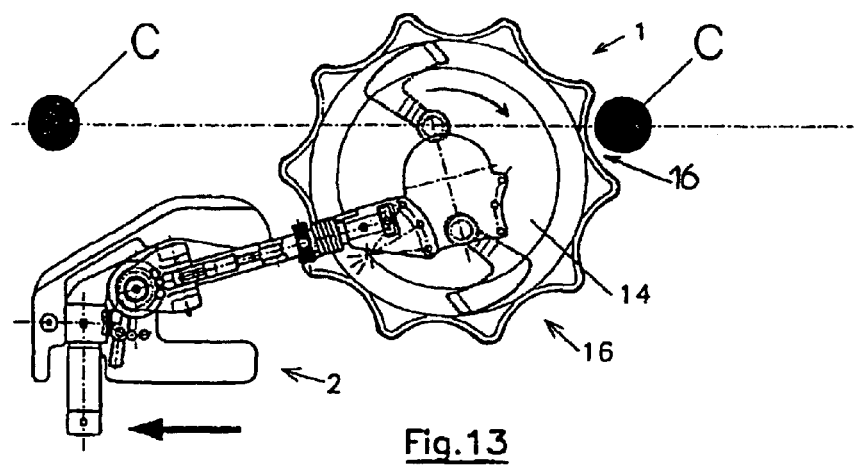

FIGS. 11 to 13 show the operating mode of the notched turning guide 14 according to the invention.

During the encounter with a vinestock or trunk of a vine C (or other vertical obstacle such as a trunk of a fruit tree, fence pole), the notched guide 14 comes to grasp the vinestock, by means of one of its notches 16 (FIG. 11). The machine continues its progression parallel to the alignment of the vinestocks, the guide 14 rolls around the vinestock with which it is in contact, in moving away from its normal path (FIG. 12). It thus follows a path around the vinestock C corresponding to approximately the half circumference of it, during which the vinestock remains constantly in the bottom of the notch 16, in a manner such that the hoeing tools 10A or the mowing blades 10B operate continually very close to the vinestock, but without being able to touch and injure it.

It is understood that the fixed vinestock and the notched turning guide act like components of a gear in which the vinestock would be a fixed tooth and the guide a rotary toothed wheel; for this reason, the guide will be described as "meshing" in the description that follows and in the claims.

At the end of its rotation around the vinestock C (FIG. 13), the meshing guide separates from it, and returns to its normal initial position.

According to another important characteristic arrangement of the invention, the meshing guide 14 has, in its central part 14a approximately defined by the base of the notches 16, the general shape of a bell. The base of this bell is comprised in a first plane P—P defining a closed space E in which the rotor 7 is housed entirely, having a base that is located above the plane P—P, in a manner so that its lower part does not drag on the ground when the machine is operating.

When the machine is used as a mowing machine (FIG. 5), the blades or cutting edges 10B are also housed in the space E delimited by the base of the bell 14a and located above the plane P—P, in a manner such that they do not scrape the ground.

When the machine is used as a hoeing machine (FIG. 4), the bottom of the bell is arranged above and at a distance from a second plane P—P below which the hoeing tools 10A are located.

In an advantageous manner, the teeth or peripheral projecting parts 17 of the meshing guide 14 are raised relative to the bottom of its central part, in such a manner that the guide has the shape of a bell equipped with a crenellated edge. The raised projecting parts have an outside curved surface 17a in the vertical direction, this arrangement encouraging the slide of the guide-bell on the ground. The meshing guide shaped in this way can easily climb up banks, while its capacity to easily slide makes it possible to obtain its return into a normal position with weaker springs, as is explained in the following.

Preferably, the guide 14 consists of a peripheral raised edge 14c oriented towards the top.

The meshing guide in the shape of a bell 14 can be advantageously made of a material equipped with a large capacity for elastic deformation, such as, for example, anti-abrasion polyurethane.

According to another very important characteristic arrangement of the invention, the working head 1 is coupled to a heavy runner 2 shaped in order to be able to slide easily on the ground S, by means of a coupling arrangement enabling turning movements of the working head around at least two perpendicular axes.

This positioning runner is comprised of a heavy piece of metal having, seen from above, an approximately trapezoidal shape. It includes a planar soleplate and its front side has, in its lower part, a curved surface that encourages it to slide on the ground while preventing it from crossing a furrow in the ground. For example, this runner can have a weight on the order of 50 kg.

On the other hand, its outside lateral face consists, in the front, of a part 2c sloped relative to its longitudinal axis and connected to a rear part approximately planar 2b and parallel to the axis.

In its rear part, the runner consists of a large opening 18 that opens to the back. This opening prevents a jam from forming between the runner 2 and the surrounding guide 14 of the working head.

The positioning runner 2 is connected to the working head by means of a coupling arm 19.

The rear end of this arm is affixed to the runner 2 by means of a connecting device of the cardan joint type. More specifically, the arm 19 is affixed by means of a cylindrical joint to the horizontal axis 20 in a cap piece 21a that has an arm support 21. This cap piece is mounted with a turning capability on a vertical axis 22 that is a rigid single piece with the runner 2 and rises up from its central zone. It is understood that the arm can thus turn around the two perpendicular axes, in a manner so that the working head affixed to the rear end of this arm can swing in the vertical direction around the horizontal axis 20 and turn laterally to the right or to the left around the vertical axis 22.

In the normal position corresponding to the working position of the machine between the vinestocks C, the meshing guide 14 is placed, at least partially and, preferably, at least for half of it, to the outside of a line L—L passing by the outside edge 2b of the runner 2 (FIG. 11). As shown previously, when a vinestock C is encountered, the runner 2, by means of its sloped side 2c, pre-positions the working head 1 and the guide 14 comes to catch with this vinestock, around which it rolls in moving (according to the arrow F1 in FIG. 12) to the inside, in the direction of the center of the area between the rows.

Mechanisms support the working head 1 in this position, and allow the lateral displacement of the head in the direction of the inter-row areas and ensure its return into the normal position, after passing the vinestock.

These mechanisms are, for example, comprised of a helicoidal spring 23 arranged around a cylindrical sleeve 21b for mounting of the support of the arm 21 and fixed by means of its ends, on the one hand, in a hole 24 that contains it, and, on the other hand, in a hole 25 that has an instrument that is unified as a single piece with the axis 22 or the runner 2. The support of the arm 21 and/or the runner (or the attachment instrument rigidly unified as a single piece with the runner) can consist of several holes located in a circular arc (FIG. 2) in order to make it possible to modify the placement of the anchorage point of at least one of the ends of the spring 23. It is thus possible to control the restoring moment or the stiffness of this spring.

On the other hand, a damping device, preferably comprised of an adjustable hydraulic damping device 26, connects the support of the arm 21 or casing of the cardan device and the coupling arm 19. This damping device 26 makes it possible to stabilize the hoeing or mowing head during work, in preventing the head from progressing by successive bounces, notably on rocky ground; it thus allows a better work in good conditions of safety.

The working head 1 is mounted with a latitude for swinging around an axis parallel to the longitudinal axis of the runner 2 or the axis of progression of the equipment: runner 2 working head 1.

The rear end of the coupling arm 19 is connected to the working head 1 by means of a cylindrical joint 27, in a manner such that the working head can swing around this end.

A stopper system, preferably controllable, limits the amplitude of this swinging, in a manner so as to prevent the working head from be able to swing with too large an extent that would create a risk of turning around the head.

This stopper system is, for example, comprised of a helicoidal spring 28 around the coupling arm 19 and fixed, on the one hand, to a sleeve 29 or other piece that is rigidly united with the casing 9 of the working head, and, on the other hand, to a collar 30 mounted around this arm and held solidly to this piece, for example, by means of a pressure screw 31, or other mounting instrument that can be dismounted, making it possible to modify the angular position of the collar. The collar makes it possible to adjust the stiffness of the spring 28.

In addition to its anti-swing function, the arrangement mentioned above makes it possible to absorb the swinging movements of the hoeing or mowing head during work and to pin the base of the guide-bell against the ground, notably when it is in the contact zones with the vinestocks.

The tractor runner 2 is connected to the distal end of the arm 3 of the adjustable towing attachment frame 4 by means of a coupling device that permits turning movements of the runner around two perpendicular horizontal or approximately horizontal axes. This device is of the cardan joint type and consists of:

an axis 32 affixed rigidly to the runner 2 and oriented in parallel to the longitudinal axis of it;

a piece in the shape of a T comprised of a bushing 33 and an axis 34 oriented transversally and solidly connected as a single piece with it; this bushing being mounted in free rotation around the axis 32; and a bushing 35 affixed to the distal end of the arm 3 and in which the axis 34 is mounted with a latitude of rotation.

It is noted that because of its swinging radius around the two horizontal perpendicular axes, the runner moves while closely following the surface of the ground regardless of the unevenness encountered during its progression (sloping or banking). The transverse axis 34 makes it possible to follow the shape of the ground in the direction of progress, while the longitudinal axis 32 makes it possible to free itself of problems of banking. In this manner, the hoeing or mowing head 1 coupled to the runner acts in the same way and the surrounding guide 14 stays pinned against the ground regardless of the configuration of it.

A balancing device, preferably adjustable, for example comprised of a helicoid spring 36 acting by tension, is affixed, by means of its opposite ends, on the one hand, to a point close to the distal end of the arm 3 and, on the other hand, to the front part of the runner (FIG. 8); this balancing spring makes it possible to prevent the runner from being planted in the ground, in limiting the amplitude of its swinging to the front.

Figure 6:
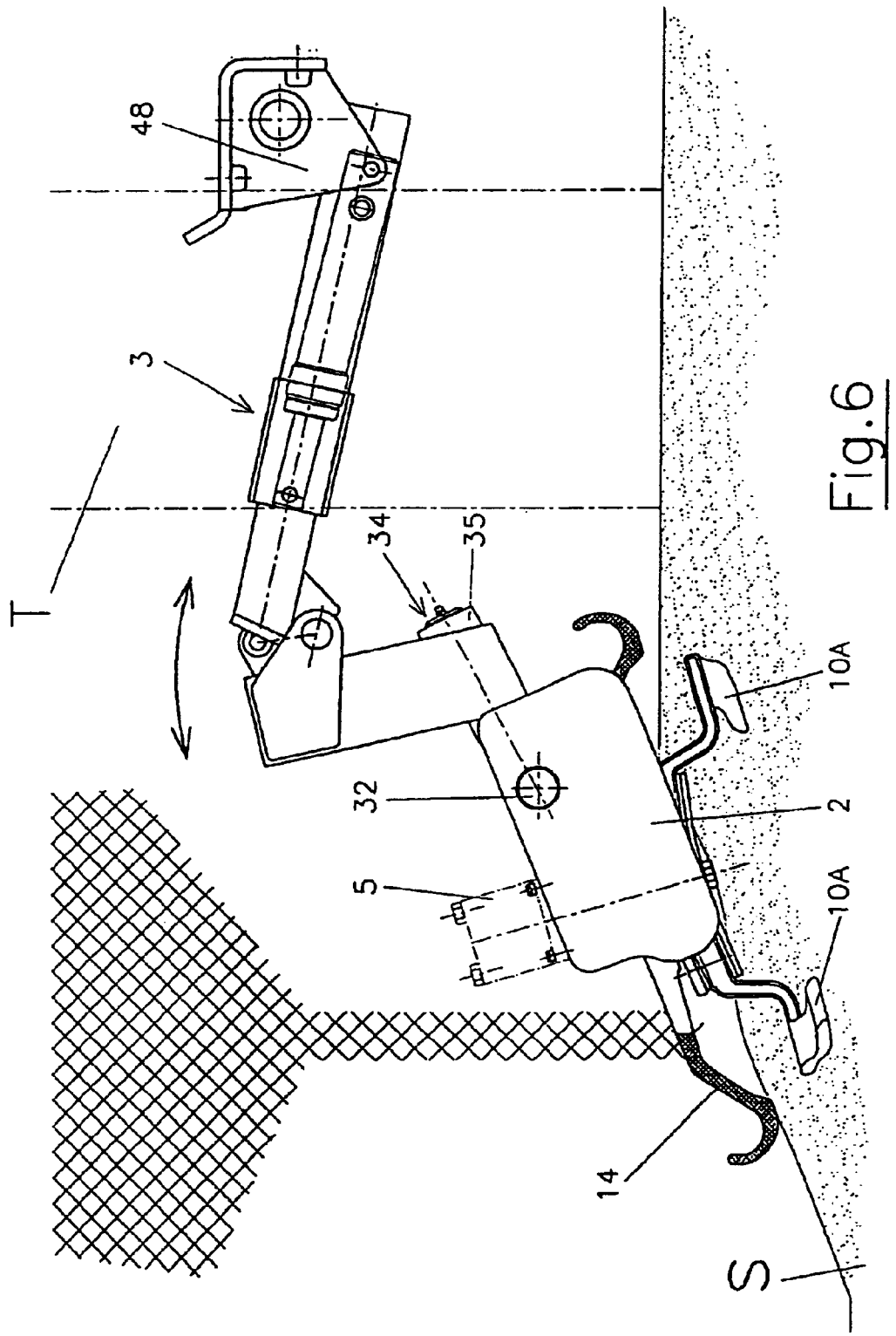
FIG. 6 is a front view and FIG. 7 is a rear view, with partial sectional views, showing two working banked positions of the hoeing equipment, these figures also showing the floating mounting of the towing attachment frame.

FIG. 6 shows, as an example, a position of the swinging of the runner 2 around the axis 32 corresponding to the sliding of the runner on banked ground.

Figure 7:
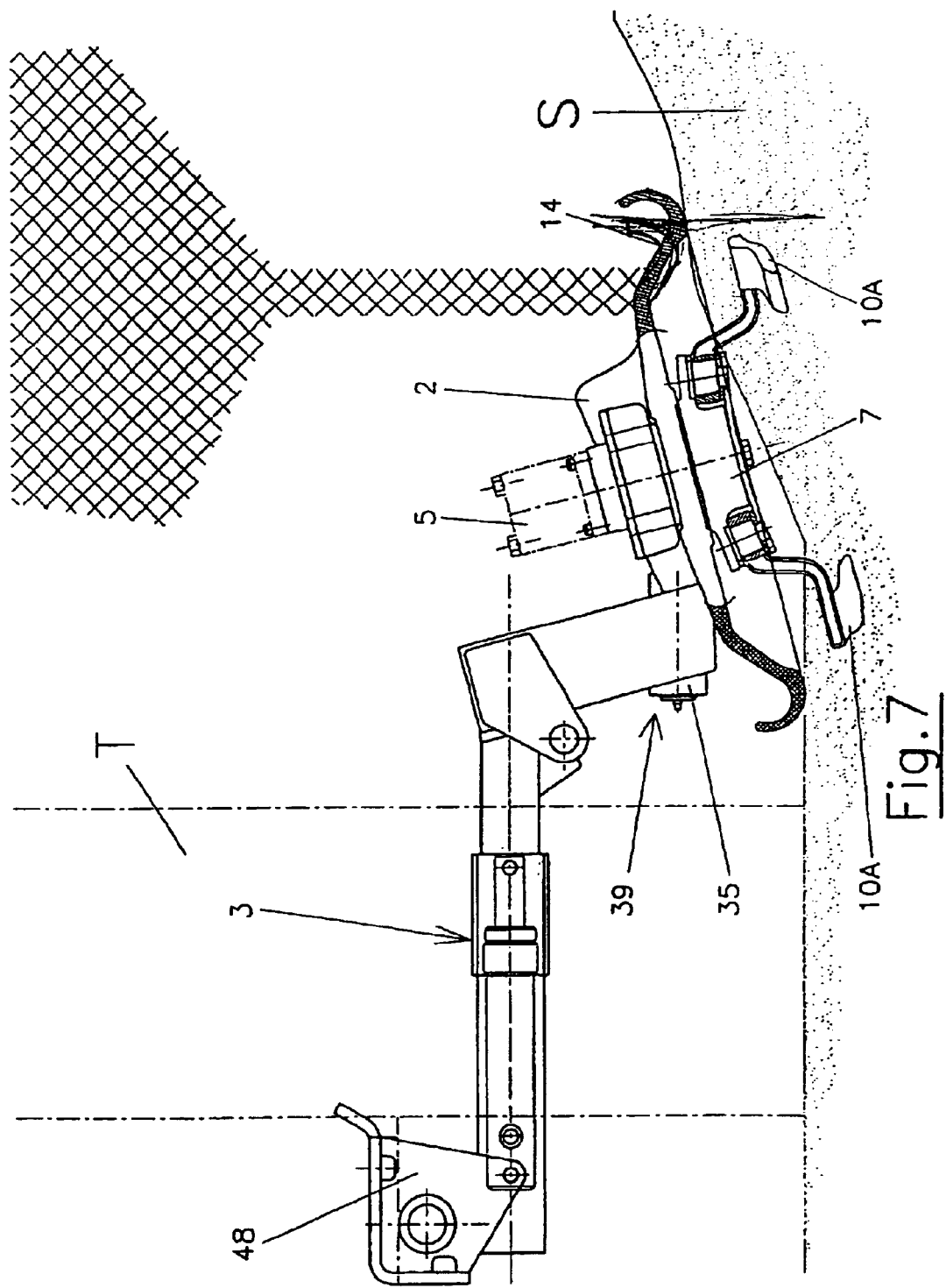
Figure 8:
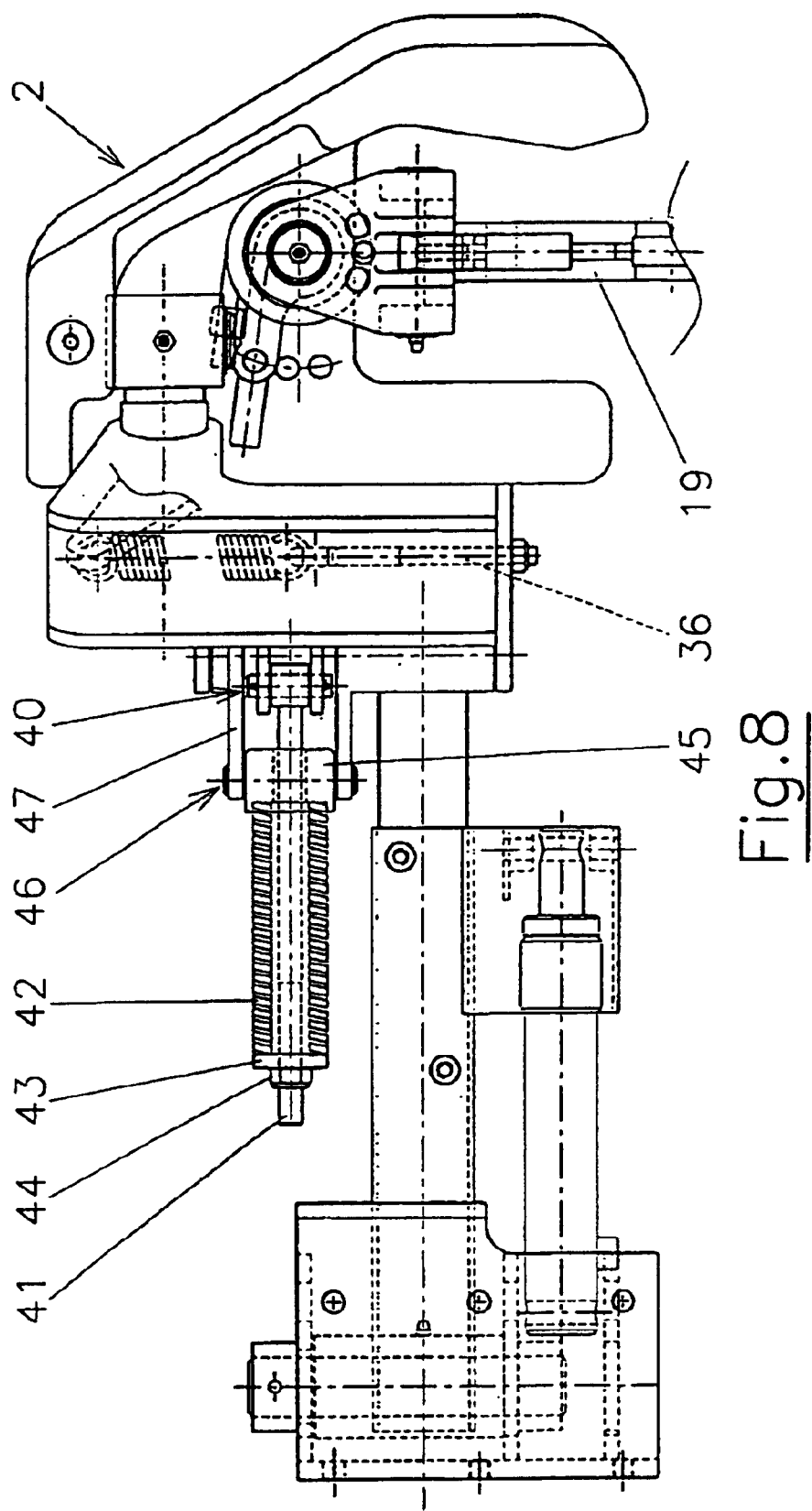
FIG. 8 is a plan view of the towing attachment frame of the machine.

FIG. 7 shows the action of a hoeing head moving on banked ground; it can be seen that by the guide in the shape of a bell, the tools are ideally positioned in the ground S, in order to effectively perform their function.

As previously indicated, when a vinestock C or other vertical obstacle is encountered, the runner 2 can be caused to slide, by means of its sloped surface 2c, on this obstacle, in a manner so that the runner is pushed back laterally in the direction of the center of the inter-row areas of the vineyard in which the working head is gliding.

The distal end of the arm 3 is arranged in a manner so as to allow this movement and to ensure the return of the runner into its normal position. This situation is shown in FIGS. 9 and 10.

The bushing 35 in which the axis 34 is housed is rigidly united with the lower end of a swinging part 38 that has an upper part that is fixed, by means of a joint 39 onto the distal end of the arm 3. On the end of this part, affixed by means of a joint 40, is one of the ends of a shaft 41 around which a spring 42 is arranged acting in extension. This spring 42 is supported, by means of its opposed ends, on the one hand, against a washer 43 held by a nut 44 screwed down on the free end of the shaft 41, and on the other hand, against a stopper 45 mounted so that it turns, by means of the axes 46, in a sleeve 47 that is rigidly united with the base 3.

Figure 9:
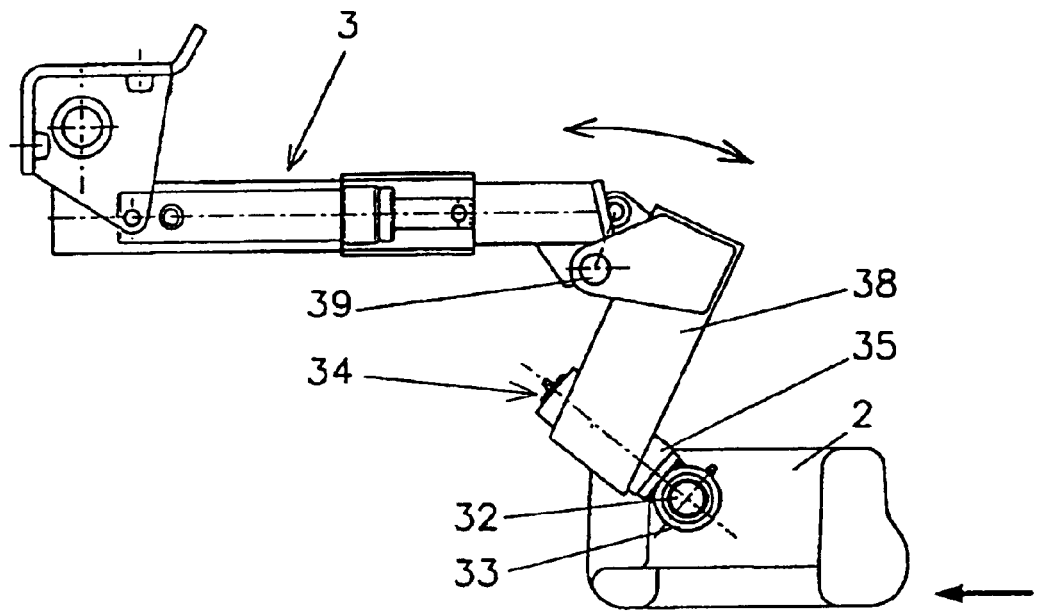
FIGS. 9 and 10 are elevation views showing the withdrawal of the heavy runner when it encounters a hard obstacle.
Figure 10:
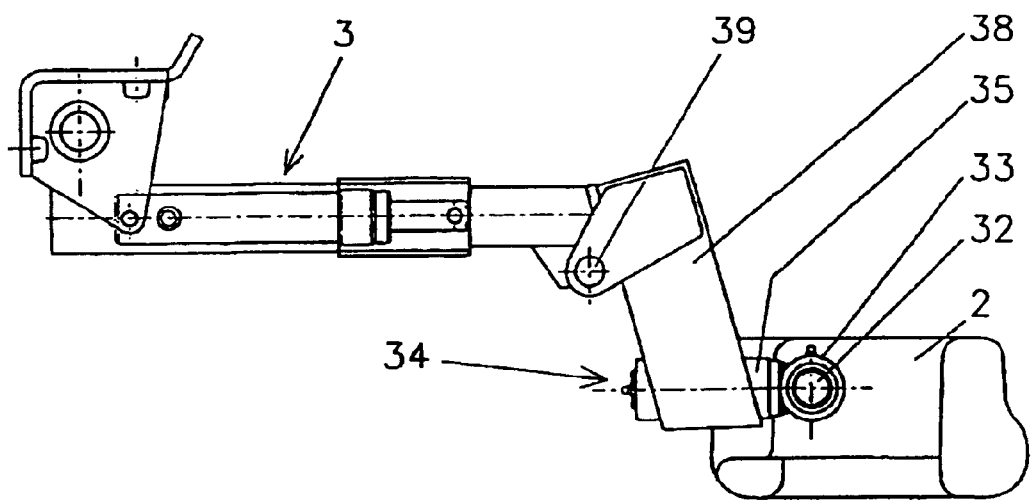

FIG. 9 shows a withdrawal position of the runner 2, in the direction of the center of the inter-rows, according to which the spring 42 of the device described above is compressed, while in the situation of return to normal position, shown in FIG. 10, the spring is relaxed.

The adjustable towing attachment frame supporting the arm 3 is mounted, in a detachable manner, on an attachment fitting 48 affixed on the frame of the carrying vehicle, on the side, or in front, or in the rear, on the right, or on the left of this vehicle.

When the meshing guide 14 is mounted free in rotation, the rotation of the hoeing tools 10A at a speed on the order of 200 to 3000 revolutions/minute, causes a movement of the ground and the pulled-out roots, and this shuffled mass can play the role of engaging by friction causing the meshing guide then to turn the tools and turning guide in the same direction, as if it was a motor. This rotation can reach large speeds that are undesirable, notably in the applications to hoeing machines.

According to a characteristic device of the invention, this problem is solved by a construction according to which the meshing guide 14 is coupled to a motorization that ensures it is driven at a speed that is approximately equal to, or preferably, slightly greater than the speed for the progression of the machine during work.

Figure 14:
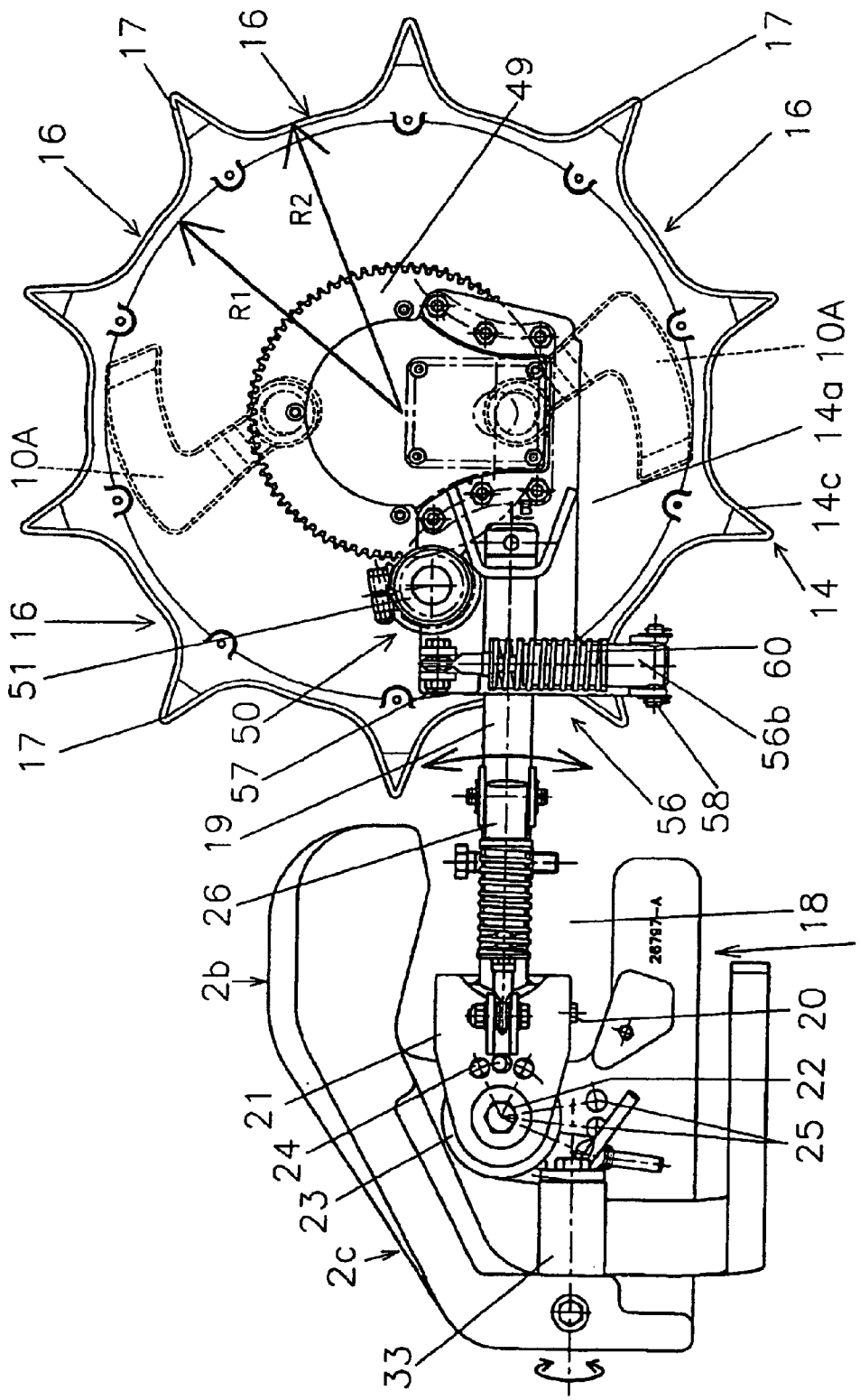
FIG. 14 is a plan view of a second embodiment example of hoeing equipment dragged by the machine according to the invention.
Figure 15:
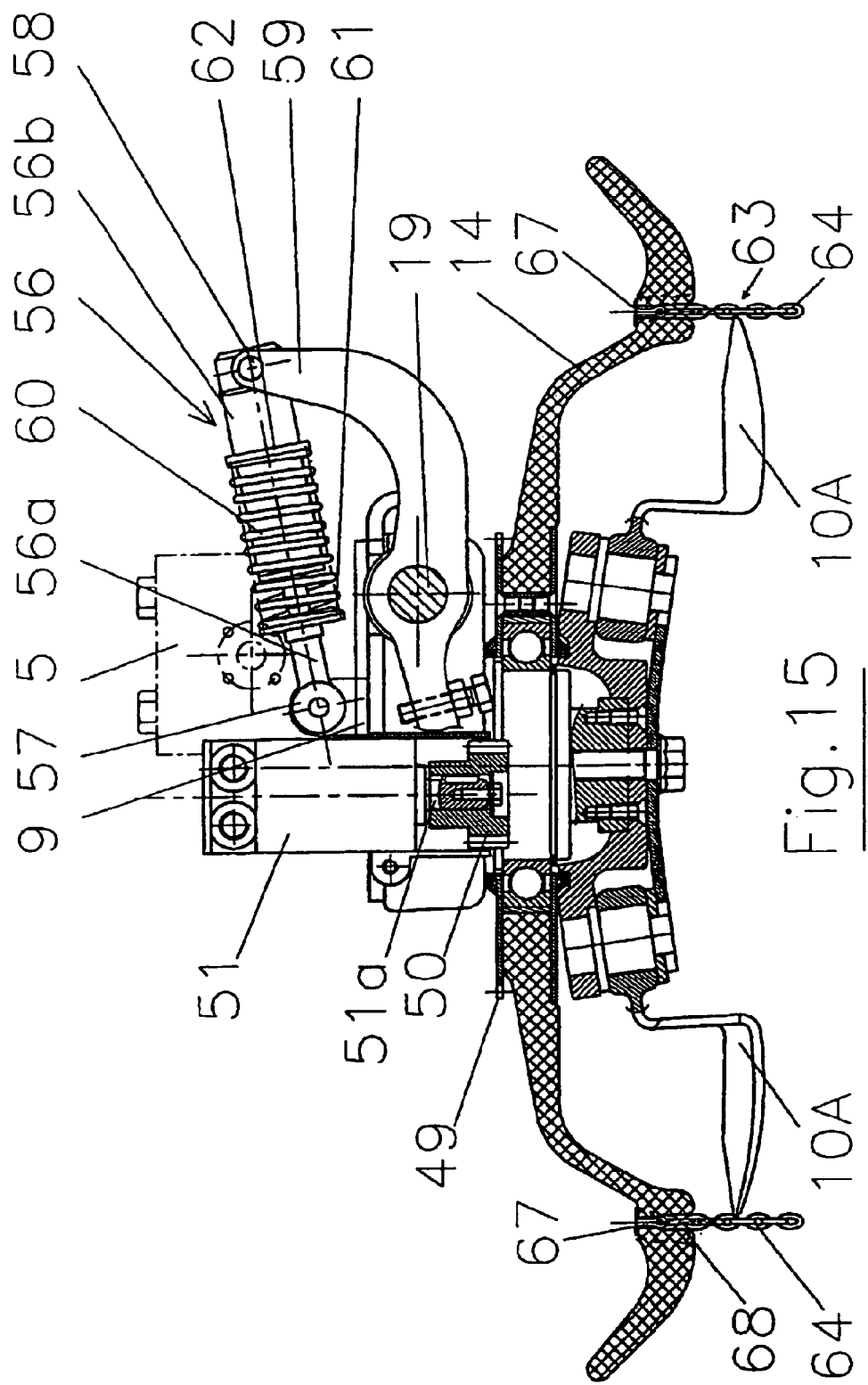
FIG. 15 is a transverse section view of the hoeing head according to this second implementation example.
Figure 16:
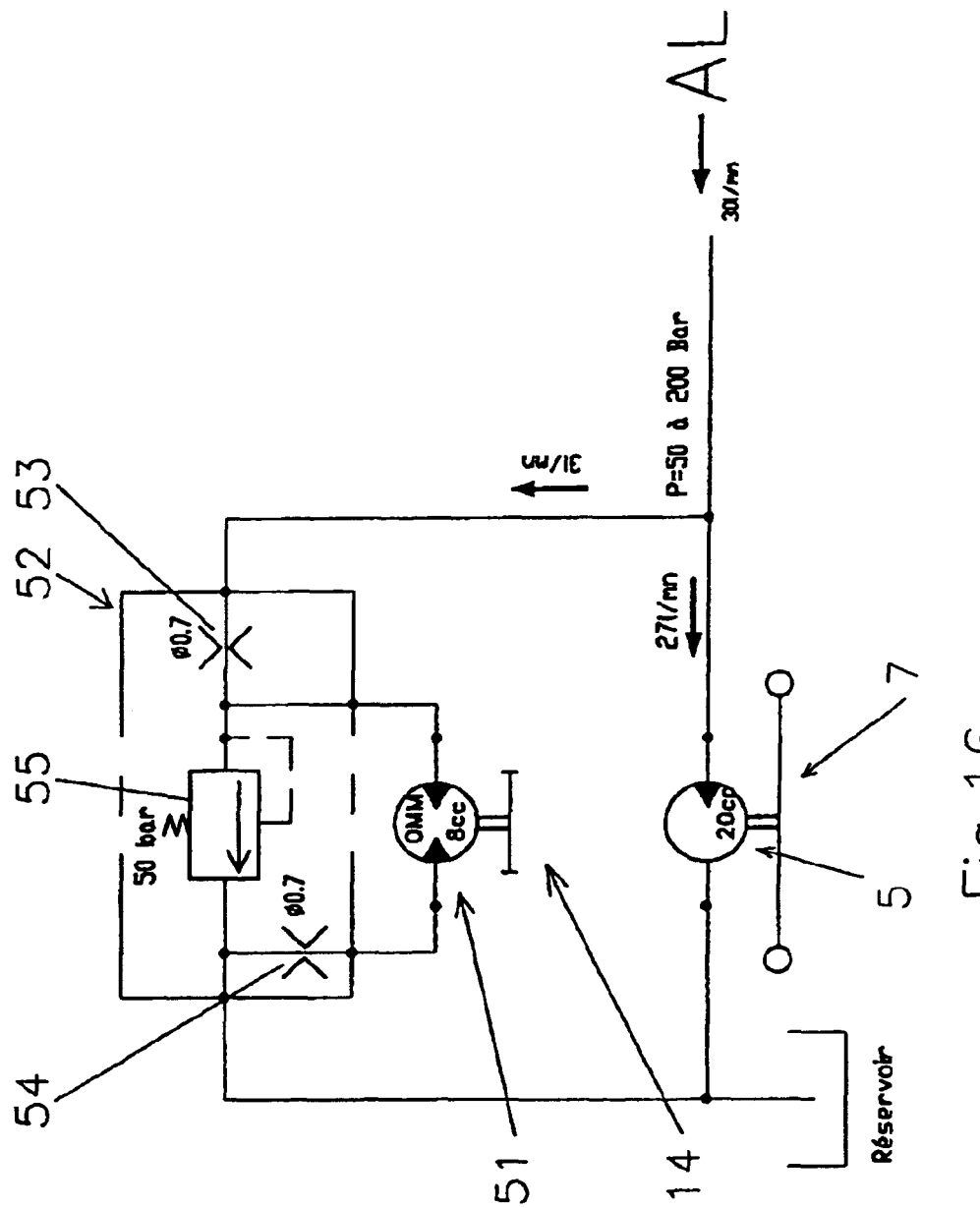
FIG. 16 is a schematic view of the hydraulic drive circuit in rotation of the meshing guide.

According to the example shown in FIGS. 14 to 16, a toothed crown 49 is affixed concentrically on the meshing guide 14, by screwing down or otherwise. This toothed wheel 49 is in mesh with a pinion 50 set on the output shaft 51a of a hydraulic motor 51; the choice of the hydraulic energy in order to ensure the driving in rotation of the meshing guide is a preferred option, this energy is in effect used in order to drive the tool-holder rotor 7.

Shown in FIG. 16 is the hydraulic control circuit of the motor 51 ensuring the driving in rotation of the meshing guide 14.

For the sake of simplicity, the drive motor 51 is mounted in parallel with the drive motor 5 of the tool-holder rotor (a mounting called "in series" would also be possible).

The hydraulic supply circuit of the motor 51 consists of a distributor unit designated in its entirety by the reference 52 and including a properly calibrated first nozzle 53 connected to the input of the motor 51, a second adequately calibrated nozzle 54 connected to the output of the motor, and a discharge valve 55 (pressure limiter).

The distributor unit 52 draws off, by the action of the calibrated nozzle 53 arranged on the supply line AL of the hydraulic circuit, an oil flow that is sufficient so that the motor 51 drives the meshing guide 14 at an optimal rotational speed without excessively penalizing the flow rate necessary for the drive of the motor 5, in spite of the fact that the pressure of the circuit varies constantly because of the irregular couple induced by the rotation of the tools in the ground. A nozzle 54 connected to the output of the motor 51 allows the control of the rotation of the meshing guide 14 in the case where it would have the tendency to become "carried" (effect of engaging created by the moved ground) while controlling a low compression in the body of this motor, which prevents any possibility of cavitation (necessary condition for an excellent lifetime of the motor).

The discharge valve 55 makes it possible to control the moment supplied by the motor 51 in thus making it possible, on the one hand, to adapt the speed of rotation of the meshing guide 14 to the speed of displacement of the machine and, on the other hand, the gentle engaging of the meshing guide 14 on the vinestocks or trunks of the shrubs, in a manner so as to not injure them.

It is observed that if the movement of the machine is interrupted while maintaining the rotation of the motor 5, the rotation of the meshing guide 14 stops, in a manner such that it can not damage the vinestock or trunk with which it could come into contact at the moment the machine stops.

It is understood that the hydraulic circuit shown in FIG. 16 comprises a device for the assistance and regulation of the rotational speed of the motor 51 for driving the meshing guide 14, this speed being proportional to the speed of displacement of the machine.

FIGS. 14 and 15 show another embodiment mode of the mechanisms limiting the amplitude of the swinging of the working head around the coupling arm 19, in order to prevent it from be able to turn with too large an extent creating a risk of the return of the working head, or so that it does not progress with jolts harmful to the quality of the work and able to damage the vinestocks.

In this case, these mechanisms comprise a damping device 56 connected, by means of its opposed ends and by means of joints 57, 58, respectively, on the one hand, to the casing or support 9 of the working head, and, on the other hand, to a swinging lever 59 set on the coupling arm 19.

On the other hand, a helicoid spring 60, acting in compression, is arranged around the damping device 56. This helicoid spring is set against the stopper washers 61, 62 affixed, respectively to the mobile shaft 56a and to the body 56b of the damping device. The stopper 62 has a position that is adjustable on the damping device 56, in a manner so as to allow a control of the stiffness of the spring 60.

Figure 17:
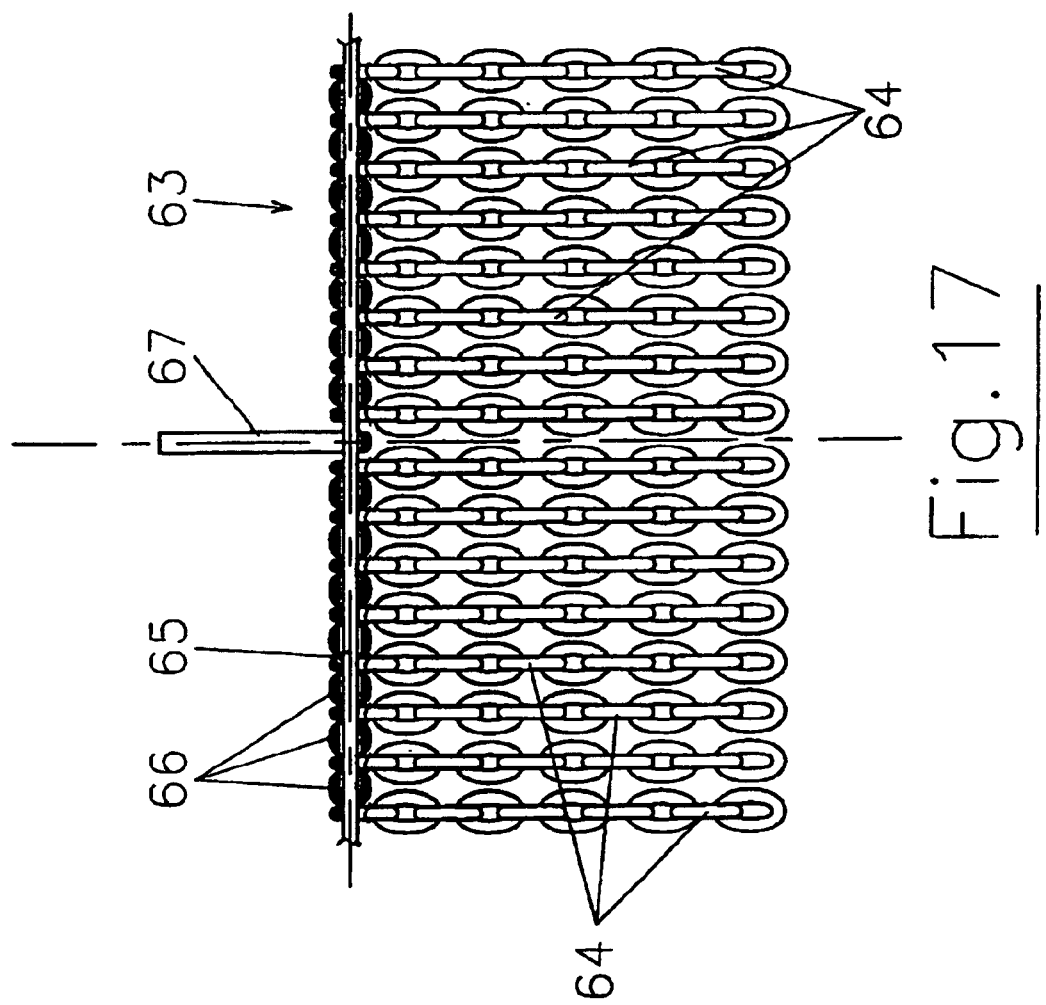
FIG. 17 is a partial, front view at a larger scale, of a flexible anti-ejection curtain affixed under the meshing guide in the vicinity of its periphery.

According to the embodiment mode shown in FIGS. 15 and 17, a peripheral anti-ejection curtain 63, flexible and detachable, is affixed under the meshing guide 14 inside of a circle tangent to the base of the notches 16 of it. This curtain is, for example, made up of chains 64 having straight or twisted links, held by a retaining ring 65 housed in a groove 68 arranged in the soleplate of the meshing guide 14, these chains being held in place by the small annular spacers 66.

The anti-ejection curtain 63 is affixed to the meshing guide 14, by means of cotter pins 67 going through holes arranged in the meshing guide 14, near the periphery of it, where these holes are spaced, for example, on the order of 36°.

It is understood that this peripheral flexible protection curtain effectively prevents any ejection of rocks, earth, dust, etc. during work, regardless of the position of the rotary tools relative to the level of the ground.

We claim:

1. A multifunctional machine for cultivating between trunks in tree or shrub plantations comprising:
   a motor;
   at least two interchangeable tools; and
   a working head drivingly connected to said motor, said working head containing a rotor, the interchangeable tools being affixed to said rotor, said working head comprising a machine guide arranged above the interchangeable tools, said machine guide shaped peripherally so as to mesh with the trunk, said meshing guide turnable at a speed that is different than a speed of said rotor, said meshing guide having a shape of a notched disk, said notched disk having notches and projecting parts arranged alternately therearound, the interchangeable tools having an operating radius with a length not more than a length of a radius of a circle tangent to a base of said notches, said meshing guide having a bell shape in a central part thereof.

2. The multifunctional machine for cultivating between trunks according to claim 1, said meshing guide being mounted coaxially to a rotational axis of said rotor.

3. The multifunctional machine for cultivating between trunks according to claim 1, said rotor being is housed entirely in a closed space defined by a base of said bell shape.

4. The multifunctional machine for cultivating between trunks according to claim 1, the interchangeable tools being entirely contained in a space defined by a base of said bell shape.

5. The multifunctional machine for cultivating between trunks according to claim 1, said bell shape having a base that is included in a first plane located above and at a distance from a second plane below which a working part of the interchangeable tools is arranged.

6. The multifunctional machine for cultivating between trunks according to claim 1, said projecting parts of said meshing guide being raised relative to a base of said central part.

7. The multifunctional machine for cultivating between trunks according to claim 1, said meshing guide being coupled to a motor means for ensuring a drive of said meshing guide in rotation at a speed approximately equal to or slightly greater than a speed of the machine.

8. The multifunctional machines for cultivating between trunks according to claim 7, said motor means comprises a hydraulic motor controlled by a distributor unit in a manner such that the rotational speed remains proportional to the speed of the machine.

9. The multifunctional machine for cultivating between trunks according to claim 1, said meshing guide being made of a material having a large capacity for elastic deformation.

10. The multifunctional machine for cultivating between trunks according to claim 1, said projection parts of said meshing guide have a general shape of a triangle with a rounded peak.

11. The multifunctional machine for cultivating between trunks according to claim 1, said working head being coupled to a runner slidable on the ground by a coupling means, said coupling means for permitting turning movements of said working head around two approximately perpendicular axes.

12. The multifunctional machine for cultivating between trunks according to claim 11, further comprising:
    means for supporting said working head in a position in which said meshing guide is placed at least partially placed outside a line passing from an outside edge of said runner, said means for supporting for permitting the movement of said working head in a direction toward a center of inter-rows of the trunks when a vertical obstacle is encountered and for ensuring a return into the position of said working head after passing the vertical obstacle.

13. The multifunctional machine for cultivating between trunks according to claim 11, said coupling means comprising:
    a coupling arm connected by a joint to an axis horizontal to a support arm, said support arm affixed on a vertical axis that is connected as a single piece with said runner; and
    a spring fixed by opposite ends thereof to said support arm and to said runner, said spring urging said working head into a position in which said meshing guide is placed at least in part outside a line passing through an outside edge of the runner.

14. The multifunctional machine for cultivating between trunks according to claims 13, further comprising:
    a damping device connecting said support arm and said coupling arm.

15. The multifunctional machine for cultivating between trunks according to claim 13, said working head being mounted with a swinging radius around an axis of an end of said coupling arm.

16. The multifunctional machine for cultivating between trunks according to claim 15, said working head being connected to a rear end of said coupling arm by a cylindrical joint.

17. The multifunctional machine for cultivating between trunks according to claim 15, further comprising:
    an adjustable stopper system limiting an amplitude of said swinging radius of said working head.

18. The multifunctional machine for cultivating between trunks according to claim 17, said stopper system comprising a helicoid spring arranged around said coupling arm and affixed to a piece rigidly united as a single piece with a casing of said working head and affixed to a collar mounted around said coupling arm and united as a single piece with said collar by of a press-screw.

19. The multifunctional machine for cultivating between trunks according to claim 11, said runner being connected to a distal end of an arm of an adjustable towing attachment frame by a coupling device, said coupling device permitting turning movements of said runner around two approximately horizontal axes.

20. The multifunctional machine for cultivating between trunks according to claim 19, further comprising:
    a balancing device being affixed at one end to a point near said distal end of said arm of said adjustable towing attachment frame and at an opposite end to a front part of said runner.

21. The multifunctional machine for cultivating between trunks according to claim 11, further comprising:
    means for permitting a lateral withdrawal of said runner during an encounter with a hard obstacle and for ensuring a return of said runner to the normal position after passing the obstacle.

22. The multifunctional machine for cultivating between trunks according to claim 1, said meshing guide being is equipped with a flexible peripheral anti-ejection curtain.

* * * * *